(12) United States Patent
Chan

(10) Patent No.: US 9,710,078 B2
(45) Date of Patent: Jul. 18, 2017

(54) TOUCH PANEL AND METHOD FOR FABRICATING THE SAME

(75) Inventor: Winston Chan, Hong Kong (HK)

(73) Assignee: WINSKY TECHNOLOGY LIMITED, Hong Kong (HK)

( * ) Notice: Subject to any disclaimer, the term of this patent is extended or adjusted under 35 U.S.C. 154(b) by 22 days.

(21) Appl. No.: 13/046,426

(22) Filed: Mar. 11, 2011

(65) Prior Publication Data

US 2011/0234520 A1    Sep. 29, 2011

(30) Foreign Application Priority Data

Mar. 25, 2010 (TW) ................. 99109028 A

(51) Int. Cl.
*G06F 3/041* (2006.01)

(52) U.S. Cl.
CPC .... *G06F 3/041* (2013.01); *G06F 2203/04103* (2013.01); *Y10T 29/49155* (2015.01)

(58) Field of Classification Search
CPC .... G06F 3/0488; G06F 3/04883; G06F 3/045; G06F 3/044; G06F 3/041; G06F 3/0412; G06F 2203/04103; H01L 33/0079; H01L 33/20; Y10T 29/49155; H05K 3/36–3/368
USPC ...................... 178/18.01–20.04; 345/173–184
See application file for complete search history.

(56) References Cited

U.S. PATENT DOCUMENTS

| | | | |
|---|---|---|---|
| 6,885,157 B1 * | 4/2005 | Cok et al. .................. | 315/169.3 |
| 8,243,032 B2 | 8/2012 | Nishiwaki et al. | |
| 8,259,079 B2 | 9/2012 | Watanabe et al. | |
| 8,441,583 B2 | 5/2013 | Lee et al. | |
| 8,599,149 B2 * | 12/2013 | Lee et al. ...................... | 345/173 |
| 2008/0277678 A1 * | 11/2008 | Li ............................. | H01L 33/22 257/94 |
| 2009/0096759 A1 * | 4/2009 | Nishiwaki et al. ........... | 345/173 |
| 2009/0096763 A1 * | 4/2009 | Hinata .......................... | 345/174 |
| 2009/0145641 A1 * | 6/2009 | Daniel .................... | H01L 24/82 174/258 |
| 2009/0189515 A1 * | 7/2009 | Halls et al. ..................... | 313/504 |
| 2010/0026657 A1 * | 2/2010 | Gettemy et al. .............. | 345/174 |
| 2010/0053114 A1 | 3/2010 | Kaigawa | |
| 2010/0117985 A1 * | 5/2010 | Wadia ........................... | 345/174 |
| 2010/0309152 A1 | 12/2010 | Kusuda et al. | |

(Continued)

FOREIGN PATENT DOCUMENTS

| | | |
|---|---|---|
| CN | 101089803 | 12/2007 |
| CN | 101410779 | 4/2009 |
| CN | 101477421 | 7/2009 |

(Continued)

*Primary Examiner* — Amr Awad
*Assistant Examiner* — Aaron Midkiff
(74) *Attorney, Agent, or Firm* — Hamre, Schumann, Mueller & Larson, P.C.

(57) ABSTRACT

A touch panel and a method for fabricating the touch panel are presented. The touch panel includes a panel and a conductive border. A touch circuit is formed on a first side of the panel. A conductive border is formed on a circumference of the first side along the touch circuit. A method for fabricating the touch panel is further presented. The touch circuit of the touch panel is integrated onto the panel, so as to reduce the number of substrates that need to be bonded, thereby avoiding problems caused by substrate bonding and effectively decreasing the overall thickness of the touch panel.

13 Claims, 8 Drawing Sheets

(56) References Cited

U.S. PATENT DOCUMENTS

2011/0006303 A1* 1/2011 Muta ............................. 257/48
2011/0006999 A1* 1/2011 Chang .................... G06F 3/044
                                                                                        345/173

FOREIGN PATENT DOCUMENTS

| | | |
|---|---|---|
| CN | 101553776 | 10/2009 |
| EP | 1657626 | 5/2006 |
| KR | 10-2009-0024842 | 3/2009 |
| TW | M334967 | 6/2008 |
| TW | 200909915 | 3/2009 |
| TW | 200919292 | 5/2009 |
| TW | 200935280 | 8/2009 |
| TW | M371271 | 12/2009 |

* cited by examiner

US 9,710,078 B2

TOUCH PANEL AND METHOD FOR FABRICATING THE SAME

FIELD OF THE INVENTION

The present invention relates to a touch panel, and more particularly to a capacitive touch panel.

DESCRIPTION OF THE PRIOR ART

FIG. 1A shows a conventional capacitive touch panel 100. In addition to a liquid crystal and a color filter, at least an extra glass substrate 101 is needed for a touch circuit. Indium tin oxide (ITO) 102, 103 serving as a sensing unit and a driving unit are provided at two sides of the glass substrate. The upper layer ITO 102 and the lower layer ITO 103 are perpendicularly arranged. Ultraviolet (UV) film optical glue 105 is arranged between the glass substrate 101 and the panel 104. The glass substrate 101 and the panel 104 are then bonded in a vacuum manner. FIG. 1B is a sectional view of the conventional capacitive touch panel.

The popularity of light weight, compact electronic devices drives industrial demand for ever-smaller, lighter and thinner components. However, potential reductions in the thickness of conventional touch panels are constrained by the fact that the panel substrates and the touch circuit are independent from each other.

In addition, the potential for particulate contamination of each substrate may lead to formation of bubbles in the substrate bonding and adversely affect alignment thereof, affecting yield. Moreover, bonding complexity increases in accordance with the size of the contact area. Therefore, there is urgent need for a structure and a process capable of reducing the required number of substrates in the touch panel.

SUMMARY OF THE INVENTION

The present invention is directed to a touch panel and a method for fabricating the same, in which a touch circuit of the touch panel is integrated onto a panel, so as to reduce the number of substrates that need to be bonded, thereby effectively avoiding problems caused by substrate bonding and decreasing the overall thickness of the touch panel.

In an embodiment, the present invention provides a touch panel, which includes a panel and a conductive border. A touch circuit is formed on a first side of the panel. The conductive border is formed on a circumference of the first side along the touch circuit.

In another embodiment, the present invention provides a method for forming a touch panel which includes the following steps. ITO pre-formed on a first side of a panel is patterned through laser imprinting, so as to form a touch circuit. A first conductive material is printed onto a circumference of the first side of the panel along the touch circuit, so as to form a conductive border.

DETAILED DESCRIPTION

Figure 1A:
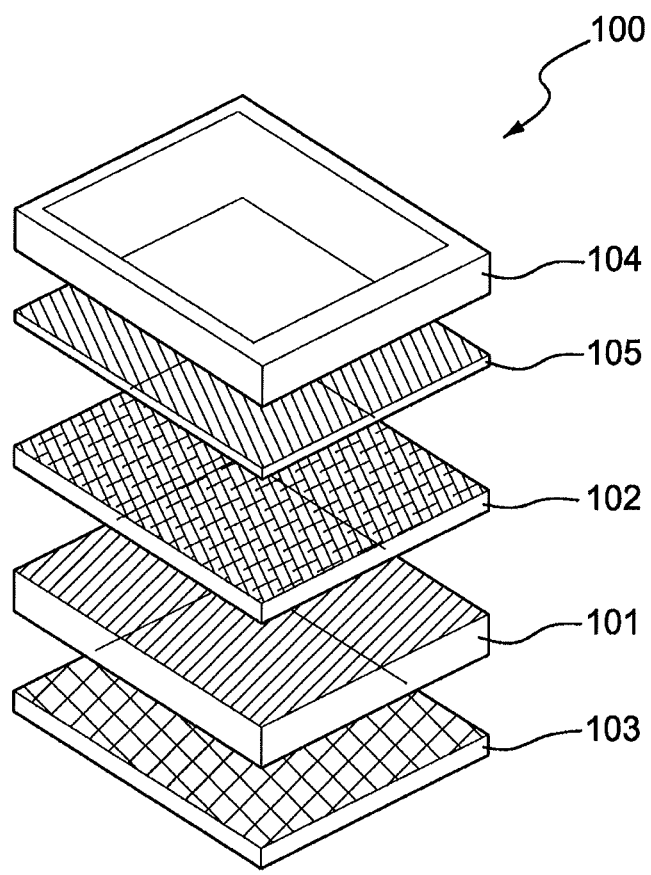
FIG. 1A shows a conventional capacitive touch panel.
Figure 1B:
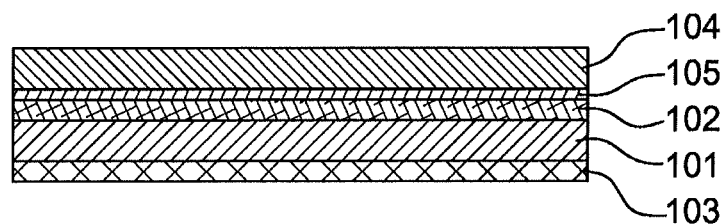
FIG. 1B is a sectional view of a conventional capacitive touch panel.
Figure 2:
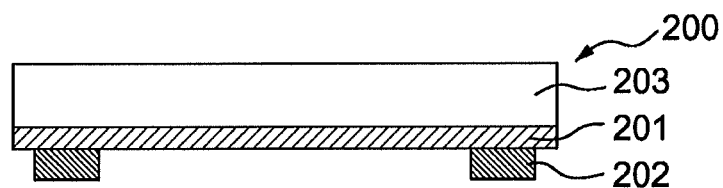
FIG. 2 shows a touch panel according to an embodiment of the present invention.

FIG. 2 shows a touch panel 200 according to the present invention, which includes a touch circuit 201 formed on a first side of a panel 203, and a conductive border 202 formed on a circumference of the first side along the touch circuit 201. In a common application, the first side of the panel 203 faces an inner side of the electronic device; that is, faces a liquid crystal and a color filter, or other display elements.

In a preferred embodiment, the panel 203 is formed of glass, plastic (for example, polyethylene terephthalate (PET)), or other optical transparent substrates, and has optical characteristics and a function of protecting the touch circuit.

In another preferred embodiment, a conductive border 202 of the touch panel 200 is printed on the first side of the panel 203 with a non-transparent conductive ink. The non-transparent conductive ink includes conductive carbon, conductive carbide, or silver colloid, and is formed on the first side of the panel 203 in a screen-printing or jet-printing manner. A conductive wire is formed within the conductive border 202, so as to transmit signals generated by the touch circuit.

In another preferred embodiment, the touch circuit 201 of the touch panel 200 includes a sensing unit, a driving unit, and an interconnection circuit therebetween (inside the sensing unit, inside the driving unit, and between the sensing unit, the driving unit, and an external controller). In another embodiment, the sensing unit, the driving unit, and the interconnection circuit therebetween are formed by patterning ITO pre-formed on the first side of the panel 203 through laser imprinting.

Figure 3:
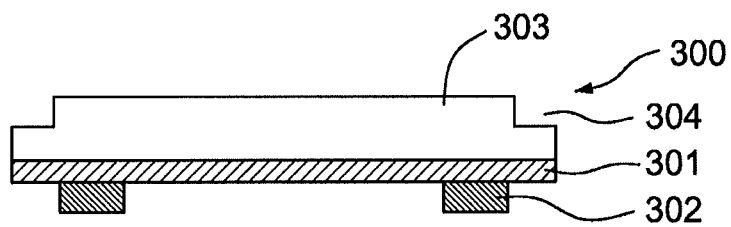
FIG. 3 shows a touch panel according to another embodiment of the present invention.

FIG. 3 shows another touch panel 300 according to an embodiment. A touch circuit 301 and a conductive border 302 are formed on a first side of a panel 303 of the touch panel 300, and a recess 304 is formed on a periphery of a second side of the panel 303. The recess 304 may be designed to connect signals of the touch circuit 301 to an external controller.

Figure 4:
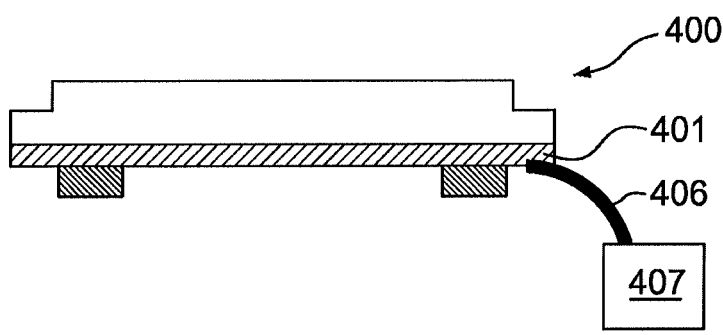
FIG. 4 shows a touch panel according to another embodiment of the present invention.

FIG. 4 shows another touch panel 400 according to an embodiment, which includes a controller 407 outside a touch circuit 401. In a preferred embodiment, the touch panel 400 has a flexible circuit 406 arranged between the touch circuit 401 and the controller 407, so as to transmit control signals and touch signals between the touch circuit 401 and the controller 407.

Figure 5:
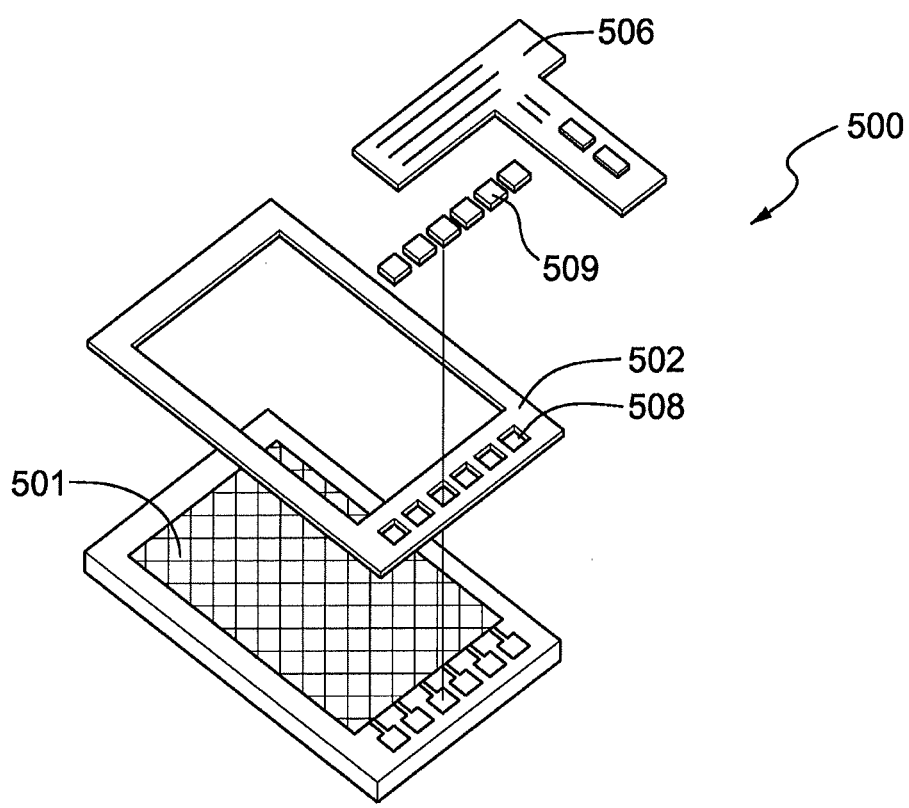
FIG. 5 is a schematic view of a touch panel coupled with a flexible circuit according to another embodiment of the present invention.

Referring to FIG. 5, apertures 508 are formed in a frame 502 of a touch panel 500, and a conductive material is printed in the apertures 508 through jet-printing, so as to form conductive pads 509. The conductive pads 509 may also be a product label or other aesthetic designs, and the flexible circuit 506 can be coupled through the conductive pads 509, so that the touch circuit 501 of the touch panel 500 is coupled to an external controller through the flexible circuit 506.

Figure 6:
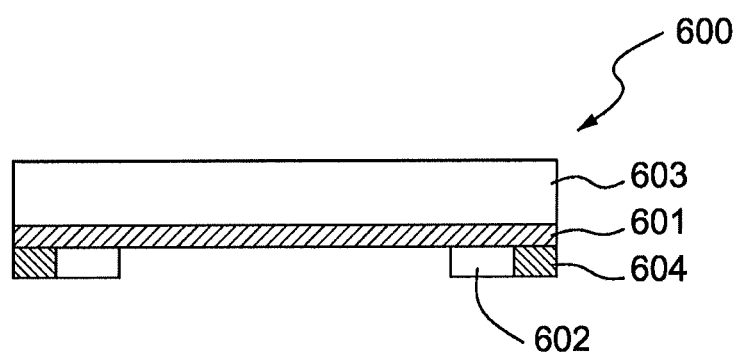
FIG. 6 shows a touch panel according to another embodiment of the present invention.

FIG. 6 shows another touch panel 600 according to the present invention, which has a touch circuit 601 formed on a first side of a panel 603. In addition, a conductive border 602 and a frame 604 are also formed on the first side of the panel 603, and the frame 604 encircles the conductive border 602.

In a preferred embodiment, the frame 604 of the touch panel 600 is formed of an insulating material through screen-printing or jet-printing. The insulating material is a black or non-transparent ink, and the conductive border 602 is formed of the non-transparent conductive ink through screen-printing or jet-printing. The touch circuit 601 includes a sensing unit, a driving unit, and an interconnection circuit therebetween, which are formed by patterning ITO pre-formed on the first side of the panel 603 through laser imprinting. The first side of the panel 603 faces an inner side of the electronic device, that is, faces a liquid crystal and a color filter, or other display elements.

Figure 7A:
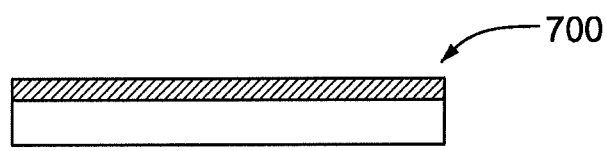
FIGS. 7A to 7C show a method for forming a touch panel according to the present invention.
Figure 7B:
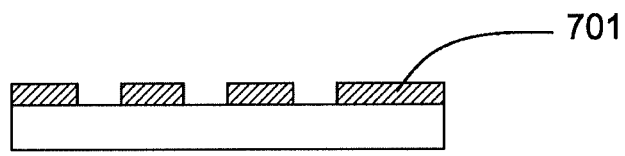
Figure 7C:
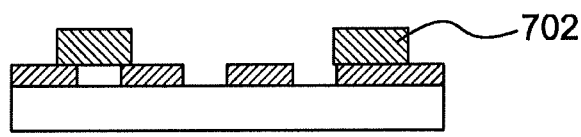

FIG. 7 shows a method for forming a touch panel according to the present invention. As shown in FIGS. 7A to 7B, ITO pre-formed on a first side of a touch panel 700 is patterned through laser imprinting, so as to form a touch circuit 701. In FIG. 7C, a conductive material is printed onto a circumference of the first side of the touch panel 700 along the touch circuit 701, so as to form a conductive border 702.

Figure 8A:
FIGS. 8A to 8F show a method for forming a touch circuit part of a touch panel according to the present invention.
Figure 8B:
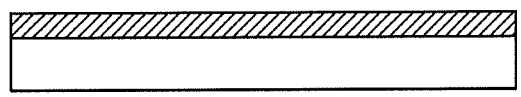
Figure 8C:
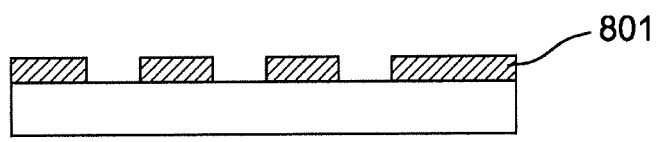
Figure 8D:
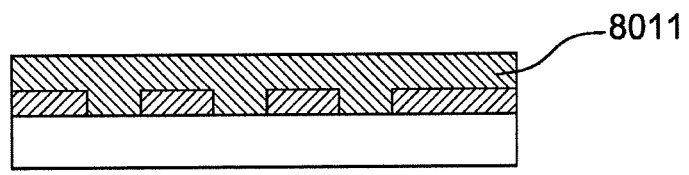

FIGS. 8A to 8F show the formation of a touch circuit part of a touch panel according to another embodiment of the present invention. In FIG. 8A, a substrate is provided, which may be glass, plastic, or other optical transparent substrates. In FIG. 8B, a layer of ITO is formed on the substrate. In FIG. 8C, a touch circuit 801 is formed by laser imprinting. The touch circuit includes a sensing unit, a driving unit, and an interconnection circuit therebetween. In FIG. 8D, an optical coating layer is further formed on the touch circuit 801. The optical coating layer may be formed by applying an insulating material on the touch circuit 801 through rolling or spin coating. In a preferred embodiment, the optical coating layer may be poly(methyl methacrylate) (PMMA) or a photoresist material, so that the optical coating layer serves as an insulation layer 8011 in the touch circuit.

Figure 8E:
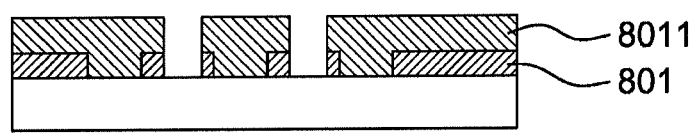
Figure 8F:
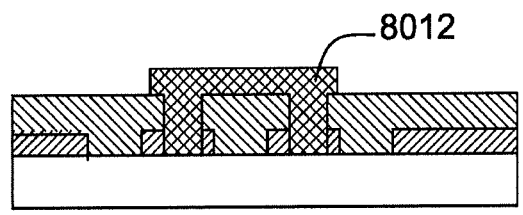

In FIG. 8E, the insulation layer 8011 is further patterned through laser imprinting, and at the same time the lower layer of ITO is also patterned to form through holes. In FIG. 8F, a conductive ink is jet-printed into the through holes, so as to form an interconnection circuit 8012 in the touch circuit. The conductive ink that forms the interconnection circuit 8012 may include a conductive polymer or other nano-metal-containing particles, such as poly(3,4-ethylenedioxythiophene) (PEDOT), nano-gold, and nano-silver.

In an embodiment, in FIG. 8F, the thickness of the ITO 801 pre-formed on the substrate is about 20 nm. The thickness of the insulation layer 8011 is about 1.5 μm. The thickness of the PEDOT that forms the interconnection circuit 8012 is about 600 nm. The size of an area of the interconnection circuit formed by the PEDOT is about 800 μm long and 300 μm wide. The size of an interconnection area inside an area of the interconnection circuit is about 200 μm long and 10 μm wide. In addition, an insulation layer having the thickness of about 1.5 μm is further coated on the uppermost layer of the touch circuit, and the insulation layer may be an optical coating layer, so as to protect the touch circuit.

Figure 9A:
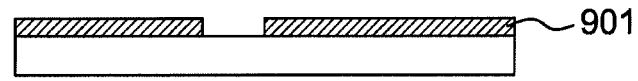
FIGS. 9A to 9E show a method for forming parts of a conductive border and a frame of a touch panel according to the present invention.
Figure 9B:
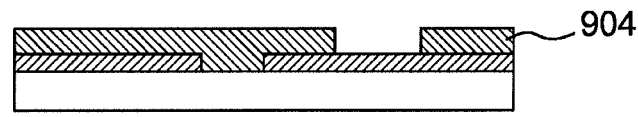

FIGS. 9A to 9E show parts of a conductive border and a frame of a touch panel according to another embodiment of the present invention. In FIG. 9A, a transparent substrate is provided. ITO 901 is pre-formed on a side of the substrate, so as to pattern the ITO layer through laser imprinting. In FIG. 9B, a frame 904 is formed on the patterned ITO 901. In a preferred embodiment, the frame 904 is formed by printing a non-transparent ink onto the patterned ITO 901 through screen-printing, and is disposed at an outer edge of the substrate. In another preferred embodiment, the non-transparent ink that forms the frame 904 is an insulating material.

Figure 9C:
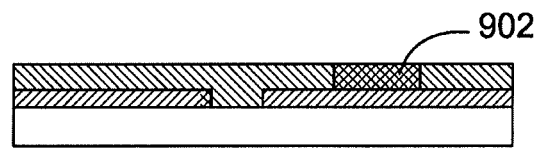

In FIG. 9C, a conductive border 902 is formed on the patterned ITO 901 within the range of the frame 904, so that the frame 904 is arranged on a peripheral of the conductive border 902. In a preferred embodiment, the ink that forms the conductive border 902 may include conductive carbon.

Figure 9D:
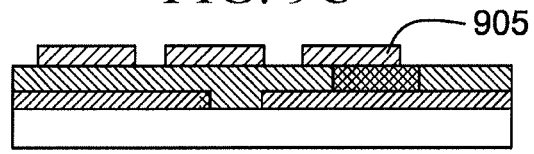

In FIG. 9D, the conductive ink is further printed on the conductive border 902 and the frame 904 through jet-printing to form metal leads 905, so as to transmit signals of a touch circuit inside the touch panel. In a preferred embodiment, the material of the metal leads includes silver.

Figure 9E:
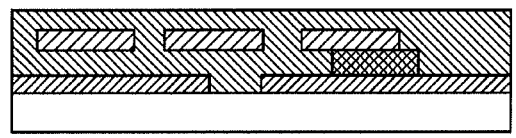

In FIG. 9E, the insulating material is further applied to cover the metal leads, so as to protect the metal leads for transmitting signals. The insulating material is the same as the insulating material that forms the frame 904.

In an embodiment, the size of an area of the conductive frame is about 2300 μm long and 300 μm wide, the width of the metal lead is about 70 μm, and the spacing between the metal leads is about 130 μm.

Figure 10:
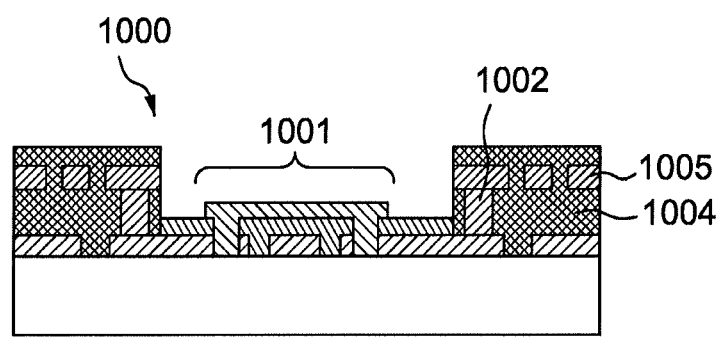
FIG. 10 shows a touch panel according to another embodiment of the present invention.

FIG. 10 shows a preferred embodiment of the present invention. In this embodiment, a method of the present invention is adopted to form a touch panel 1000, which includes a touch circuit 1001, a conductive border 1002, a frame 1004, and metal leads 1005. The method is the same as that in FIGS. 9A to 9E, and the details will be omitted herein.

Figure 11A:
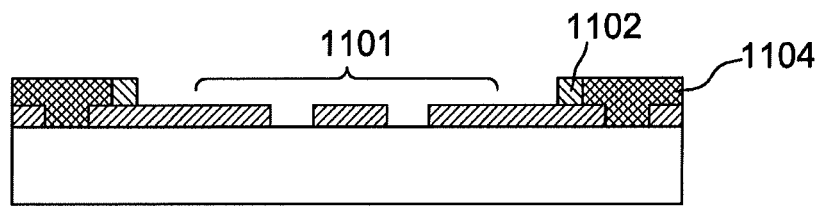
FIGS. 11A to 11C show a method for forming a touch panel according to the present invention.
Figure 11B:
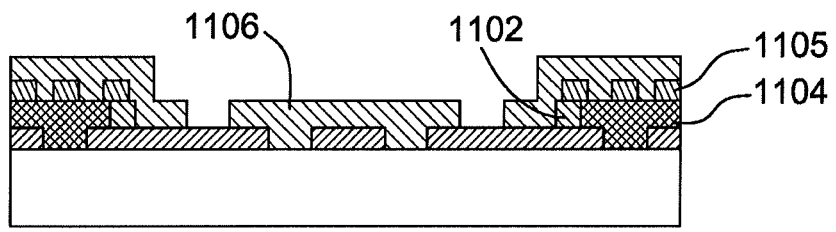
Figure 11C:
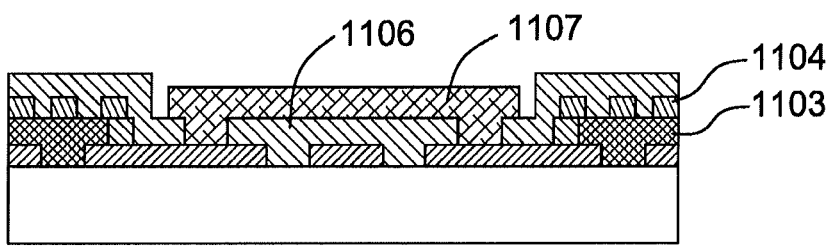

FIGS. 11A to 11C further show the formation of a touch panel according to another embodiment of the present invention. In FIG. 11A, ITO pre-formed on a first side of a substrate is patterned to form a touch circuit 1101. A non-transparent insulating material is printed at edges of the substrate through screen-printing on a peripheral of the touch circuit 1101 so as to form a frame 1104, and a conductive border 1102 is formed within the range of the frame 1104.

In another preferred embodiment of the present invention, a conductive material is printed on the conductive border 1102 and the frame 1104 to form metal leads 1105, so as to transmit signals of the touch circuit inside the touch panel. In a preferred embodiment, the material of the metal leads includes silver.

In another embodiment of the present invention, peelable glue is printed inside the touch circuit area, an insulating material is further applied on the touch circuit 1101 to form an insulation layer 1106 inside the touch circuit 1101, and the insulation layer 1106 covers the metal leads 1105, so as to protect the metal leads. In a preferred embodiment, the insulating material may be silica through PVD evaporation or a printed optical coating layer. As shown in FIG. 11B, the peelable glue is removed to pattern the insulation layer 1106.

FIG. 11C shows another embodiment of the present invention, in which peelable glue is further printed on the insulation layer 1106 of the touch circuit 1101, ITO is formed by evaporation on the insulation layer 1106, and then the peelable glue is removed, so that the evaporated ITO forms an interconnection circuit 1107 in the touch circuit.

In an embodiment, for the touch panel as shown in FIG. 11, the thickness of the ITO pre-formed on the substrate is about 20 nm, the thickness of the insulation layer 1106 is about 1.5 μm, and the thickness of the ITO that forms the interconnection circuit 1107 in the touch circuit is about 40 nm. The width of the metal lead is about 70 μm and the spacing between the metal leads is about 130 μm. The size of an area of the conductive frame is about 2300 μm long and 300 μm wide, and the size of the area may be smaller. The size of an area of the ITO interconnection circuit is about 800 μm long and 300 μm wide, and the size of an sub-interconnection area inside the area is about 200 μm long and 10 μm wide. In addition, an insulation layer having a thickness of about 1.5 μm is further coated on the uppermost layer of the touch circuit, and the insulation layer may be an optical coating layer, so as to protect the touch circuit.

Figure 12A:
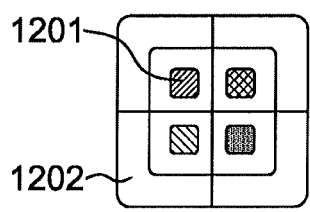
FIGS. 12A to 12C show a touch panel according to another embodiment of the present invention.
Figure 12B:
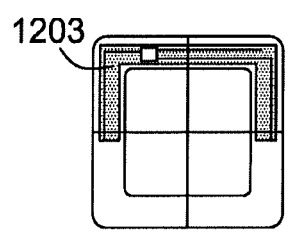
Figure 12C:
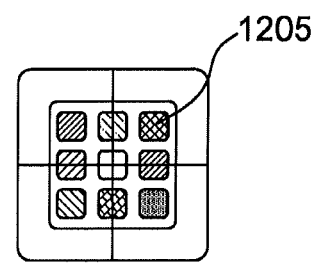

In still another preferred embodiment of the present invention, a simple touch panel is formed. As shown in FIG. 12A, a substrate pre-formed with ITO is imprinted with a laser, so as to form a plurality of sensing areas 1201, and a conductive border 1202 is formed on a peripheral of the sensing areas 1201. In FIG. 12A, a controller outside the touch panel can be externally connected through a flexible circuit 1203 at a rear side of the touch panel. In FIG. 12C, the simple touch panel may display signals at a plurality of different touch positions. Taking the touch panel in FIGS. 12A and 12C as an example, four sensing areas are divided, so that signals of up to nine touch positions 1205 can be processed.

An extra substrate is not needed for the touch panel of the present invention, as the touch circuit is already directly formed below the panel. Therefore, the number of substrates is reduced and the thickness of the touch panel is further diminished. Moreover, the assembly process is simplified and manufacturing cost is reduced, so that yield is enhanced.

Although the technical solutions and features of the present invention are described above, persons skilled in the art can still make various variations and modifications without departing from the teachings and contents disclosed by the present invention. Thus, the scope of the present invention is not limited to the disclosed embodiments but includes other variations and modifications without departing from the present invention as defined by the appended claims.

I claim:

1. A touch panel, comprising:
a panel, acting as an only substrate for a touch circuit in the touch panel, having a first side printed with the touch circuit and a second side opposite to the first side, the second side of the panel, being configured to face a user and being devoid of a touch circuit, thereby allowing the user to perform touch screen functionality from the second side;
a conductive border formed on a circumference of the first side along the touch circuit; and
a recess, formed at two opposite peripheral edges of a second side surface of the panel, the recess being configured to face the user who performs touch screen functionality, the recess being configured to transmit signals generated by the touch circuit, wherein the touch circuit comprises a sensing unit, a driving unit, and an interconnection circuit therebetween.

2. The touch panel according to claim 1, wherein the conductive border is printed on the first side of the panel with a non-transparent conductive ink, and a conductive wire is formed within the conductive border, so as to transmit signals generated by the touch circuit.

3. The touch panel according to claim 1, wherein the sensing unit, the driving unit, and the interconnection circuit therebetween are formed by imprinting indium tin oxide (ITO) formed on the first side of the panel with a laser.

4. The touch panel according to claim 1, wherein the panel is formed of at least one of glass, plastic, and other optical transparent substrates.

5. The touch panel according to claim 1, further comprising a flexible circuit and a controller, wherein the controller and the touch circuit are coupled through the flexible circuit.

6. The touch panel according to claim 1, further comprising an organic conductive layer, so as to form an interconnection circuit in the touch circuit.

7. The touch panel according to claim 1, further comprising:
an optical coating layer formed on the touch circuit.

8. The touch panel according to claim 7, wherein the optical coating layer is made of polymethylmethacrylate or photoresist material.

9. A method for forming a touch panel, comprising:
patterning indium tin oxide (ITO) pre-formed on a first side of a panel through laser imprinting so as to form a touch circuit on the first side of the panel, with a second side of the panel that is opposite the first side and devoid of a touch circuit, wherein the panel acts as an only substrate for the touch circuit in the touch panel;
allowing the second side of the panel to be viewable to a user, thereby allowing the user to perform touch screen functionality from the second side;
printing a first conductive material along the touch circuit onto a circumference of the first side of the panel, so as to form a conductive border; and
forming a recess at two opposite peripheral edges of a second side surface of the panel, thereby allowing the recess to face the user who performs touch screen functionality, the recess being configured to transmit signals generated by the touch circuit, wherein the forming of the touch circuit comprises forming a sensing unit, a driving unit, and an interconnection circuit therebetween.

10. The method according to claim 9, further comprising forming metal leads on the conductive border, so as to transmit the signals generated by the touch circuit.

11. The method according to claim 9, further comprising forming an interconnection circuit in the touch circuit with an organic conductive material.

12. The method according to claim 9, further comprising:
forming an optical coating layer on the touch circuit by applying an insulating material on the touch circuit through rolling or spin coating.

13. The method according to claim 9, further comprising:
configuring a controller outside the touch circuit and arranging a flexible circuit between the touch circuit and the controller.

* * * * *